Patented July 7, 1931

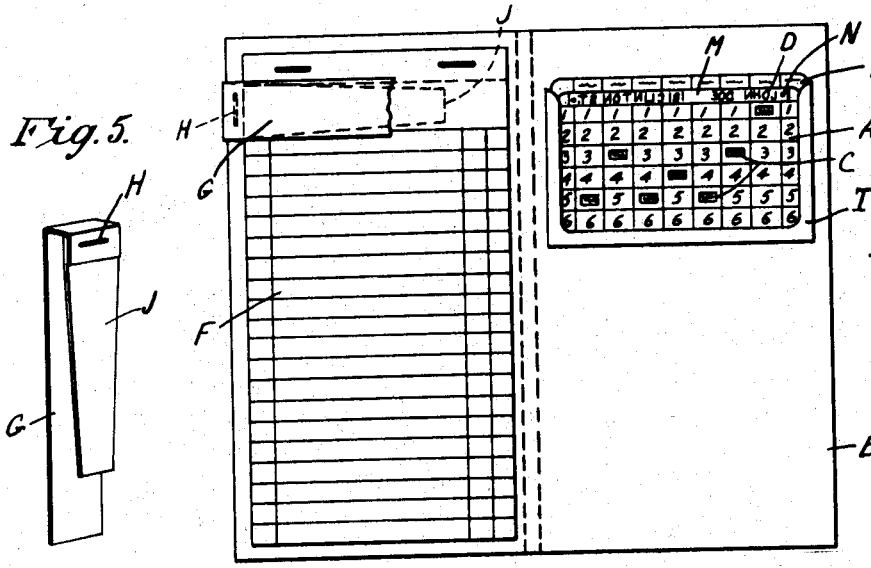
July 7, 1931. J. H. RAND, JR 1,813,257
CREDIT SYSTEM
Filed Feb. 13, 1925

1,813,257

UNITED STATES PATENT OFFICE

JAMES H. RAND, JR., OF TONAWANDA, NEW YORK, ASSIGNOR, BY MESNE ASSIGNMENTS, TO REMINGTON RAND, INC., OF NEW YORK, N. Y., A CORPORATION OF DELAWARE

CREDIT SYSTEM

Application filed February 13, 1925. Serial No. 8,909.

This invention relates to identifying methods or systems and especially to a system of safeguarding charge or credit accounts, and also to improvements in methods and devices for facilitating the handling of charge or credit accounts or credit items.

Heretofore, in certain department stores and the like, customers having charge or credit accounts have been furnished with identification tags or tokens, so that goods could be delivered to such customers over the counter upon presentation of the identification disk or token and charged to the customer's account without the necessity of having the transaction approved by the office of the store. This distribution of identification tags or coins has resulted in considerable loss, owing to the fact that the coins or tags get into hands other than the hands of the owners and before the losses have been discovered and posted to the clerks or employees of the store, considerable quantities of goods have been obtained by wrongful holders of the identification tokens.

The objects of the present invention are to provide improved identification devices which will indicate to the clerk or person to whom it is presented certain personal characteristics of the owner of the device; also to provide an improved method of accounting for department stores and the like, which will insure that goods charged are obtainable only by the rightful holders of charge accounts; also to provide improvements in the handling of charge account slips or entries; and also to provide improvements in methods of doing business upon a credit basis in the other respects hereinafter set forth and claimed.

In the accompanying drawings:—

Fig. 1 is a plan view of an order book provided with my improved credit devices.

Fig. 2 is a plan view of my improved identification card.

Fig. 3 is a plan view of a portion of the identification card applied to my improved master card.

Fig. 4 is a fragmentary plan view of a file tray provided with identification members.

Fig. 5 is a perspective view of the name imprinting device.

The invention contemplates the provision of an identification disk, card or token bearing suitable indicia and so formed as to cooperate with or be superimposed on a master chart, card or scale to indicate or reveal to the holder of the master chart, card or scale any desired identifying characteristics of the owner of the identification device. Thus, for example, in the form of the invention illustrated in Figs. 1, 2 and 3, an identification card A is provided having a plurality of numbered spaces. In the particular form shown, apertures or windows C are punched or otherwise formed in the card at certain selected numbered spaces. This identification card A is adapted to be retained by the purchaser or holder of a charge account and to cooperate with the master card or chart B retained in the store or place of business where the charge account is available, and by comparison between the identification card A and the master chart or card B, supply the person to whom the identification card is presented with sufficient information to identify the holder of the card as the owner of the card. Thus, for example, the master card B may contain matter descriptive of the physical attributes of the individual, such for example, as indicia or terms describing the color of eyes, weight, height, age, color of hair, etc. In the form disclosed, the items descriptive of the physical make-up of the customers are so arranged on the master card B that when the identification card A is superimposed thereon, a description of the physical characteristics of the true owner of said identification card may be read from the master card B through the apertures C in the identification card A. As shown in Fig. 3, the master card B may also contain information on any desired subject, such for example as notations R of credit limits, and a suitable aperture may be provided in the identification card which will determine for the clerk or employee the credit limit of the holder of the identification card A. The device may also contain data S regarding special instructions with reference to the account, such, for example, as the members of the family or servants of the holder of the charge account who may be entitled to use the account, and the identification card A may be formed to disclose such information when said identification card is applied to the master card or chart.

The identification card preferably displays the name and address of the holder of the charge account. As shown in Figs. 1, 2 and 3, this name and address may be provided in raised type or letters D on the card to facilitate the making out of charge slips. In such operation, the identification card A with the name and address of the holder thereof appearing in raised type may be inserted in an open faced pocket T secured to the charge slip or folding sales book E of the clerk and pressed upon the sales pad F at the name and address portion, either with a suitable transfer member such as carbon paper G, or ink ribbon interposed between the raised type and said sales pad so that the name and address is quickly reproduced or printed upon the charge slips and the carbon copies thereof, thus saving questioning of the purchaser as to his name and address and insuring correct spelling of any of the words forming a part thereof. The carbon paper G may be conveniently arranged in any suitable manner, such as by staple H to a piece of cardboard J, or other material, the latter being adapted to be placed between the leaves of the pad F so as to maintain the carbon paper G in operative position. At the same time, a record is made on the sales slips of the form and characteristics of the raised type D on the identification card, this latter record being useful in cases of any attempted counterfeiting of the identification card.

In order to insure that no person obtains goods on counterfeit or spurious identification cards or tokens, apertures C punched in the identification cards or tokens A disclose an arbitrary number or symbol, such for example the number 5354531Y, as shown in Fig. 2, the Y being raised on the plate M along with the other raised letters of the name and address. A duplicate of this arbitrary number or symbol appears on the charge account or credit records in the office of the establishment. As indicated in Fig. 4, this office record K is preferably of the overlapping card index type in which the names of the customers appear in overlapping relationship, one projecting beyond the other, and the arbitrary numbers or symbols L are preferably displayed on the overlapping margins adjacent the names of the customers. These numbers or symbols may contain numerals or symbols covering special instructions with regard to the account, the credit limit of the account, and also, if desired, any arbitrarily selected numerals or symbols, and may be checked with the number or symbols disclosed by the identification card or token by any suitable means prior to the delivery of the goods to the customer, as for example, by having the packer or bundle wrapper of the goods telephone the name and arbitrary number or symbol to the account office while the goods are being wrapped, and if the arbitrary number or symbol and name of the purchaser checks with those on the permanent record in the office, the transaction can be considered free from doubt. This checking on the overlapping index system in the office, which may be done at a glance by the operator of the index, prevents counterfeiting of any identification card for a selected customer without knowledge of the peculiar identifying characteristics on the account record in the office of the store or place of business.

As illustrated in Figs. 1, 2 and 3, the name and address portions of the identification card or token may be readily formed on a separate metal plate M by any of the machines now in use for producing name or address slugs, and this plate may be secured to the card by rivets N, or by any other suitable means. The master and identification cards are slipped into the open faced pocket T secured to the sales book so that they are correctly super-imposed one on the other and so that the plate M is suitably positioned opposite the title space of the sales slip F.

The provision of the name and address plate on the card or token and its utilization to print the name, address and number on the sales slips, does away with the necessity of the series of questions and replies usually necessary to obtain the customer's name and address, and correct spelling and numbers, and prevents misunderstanding between clerk and customer.

I claim as my invention:—

1. In a fraud preventing device the combination of an order book adapted to be retained by a salesman and comprising a pair of cover members, an order blank pad carried by one of said cover members, each page thereof having a section provided to receive the name of a purchaser, a card holder carried by the other of said cover members, a plurality of identification characteristics associated with said holder, a card adapted to be retained by a customer and having a plurality of openings provided therein for registry with certain of the characteristics associated with said holder when said card is properly positioned in said holder and indicative of the ownership of said card, and an impression forming member permanently mounted on said card for registry with the name section on said pad and adapted to impress through a suitable impression transferring medium the name of the customer in said section when said card is properly positioned in said holder and the identity of the purchaser is disclosed by the characteristics visible through the openings therein, by closing the covers of said book and applying pressure thereto.

2. In a fraud preventing device the combination of an order book adapted to be retained by a salesman and comprising a pair of cover members, an order blank pad carried by one of said cover members each page thereof having a section provided to receive the name of a purchaser, a card holder carried by the other of said cover members, a plurality of identification characteristics associated with said holder, a card adapted to be retained by a customer and having selecting means cooperating with certain of the characteristics associated with said holder when said card is properly positioned in said holder and indicative of the ownership of said card, and an impression forming member permanently mounted on said card adapted to impress through a suitable impression transferring medium the name of the customer in said section when said card is positioned in said holder so that the identity of the purchaser is disclosed, by the relative position of the selecting means on said card and the characteristics on said holder, by closing the covers of said book and applying pressure thereto.

3. In a fraud preventing device and salesman's customer identification means, a master card to be retained by the salesman provided with a plurality of sets of sequentially arranged sections, the sections in one set being adapted to each receive a notation of one of the various characteristics of a particular part of the human anatomy, the next adjacent set being adapted to have the sections thereof provided with notations of the characteristics of another part of the human anatomy, and other sets having the sections provided with notations of other means of identifying human beings and information concerning them, and a customer's identification card having a plurality of openings formed therein, each opening being adapted to register with a predetermined section of one set on said master card when said identification card is superposed on said master card in a predetermined position, whereby said openings collectively cooperate to expose to view the information on said master card for identifying a plurality of anatomical characteristics of a particular human being and other information relative thereto, so that a salesman may detect fraud in the use of the identification card by unauthorized persons.

4. In a fraud preventing means the combination of a salesman's order entering device comprising a pair of relatively movable elements, one of said elements supporting an order blank and the other of said elements receiving a customer's member, said member having associated therewith impression forming means adapted to impress through suitable impression transferring medium the name of the customer on said order blank, when the member is properly positioned in the element for receiving it, by relative movement of said elements to bring said order blank and said impression forming means into simultaneous cooperation with the impression transferring medium.

5. A fraud preventing means comprising a member having a record sheet mounted thereon and having means supporting an identifying unit bearing printing elements in position for movement into contact with the face of the record sheet to effect an impression thereon.

6. An article of manufacture for identifying a purchaser and for printing the name of the purchaser upon an order blank, comprising a member having raised formations thereon for impressing through a suitable transferring medium the name of the purchaser upon an order blank, and having windows therein for registry with indicia on a master member for identifying the purchaser.

7. In a fraud preventing device the combination of a salesman's order entering device comprising means for supporting an order blank having a section provided to receive the name of a purchaser, said order entering device having means for receiving a customer's identifying member, and having associated therewith a master member, one of said members having anatomical identification indicia thereon, and the other of said members having windows for registry with certain of said indicia, and said customer's identifying member having printing elements in position for movement into printing relation with the said section of the order blank when the windows are in registry with said certain indicia.

8. In a fraud preventing device comprising a customer's member and salesman's customer identification member, one of said members having a plurality of sets of anatomical characteristic identifying indicia, each of the identifying indicia of one set relating to a particular part of the human anatomy, and other sets of indicia relating to other information for identifying human beings and information concerning them, and the other of said members having a plurality of windows each for registry with a predetermined one of the identifying indicia of one of said sets when the members are juxtaposed in a predetermined relation, whereby the windows and indicia will collectively cooperate to identify a particular individual.

JAMES H. RAND, Jr.

CERTIFICATE OF CORRECTION.

Patent No. 1,813,257.  Granted July 7, 1931, to

JAMES H. RAND, JR.

It is hereby certified that the name of the assignee in the above numbered patent should have been written and printed Remington Rand Inc., instead of "Remington, Rand Inc.", as shown by the records of assignments in this office; page 2, line 24, for "printed" read imprinted; and that the said Letters Patent should be read with these corrections therein that the same may conform to the record of the case in the Patent Office.

Signed and sealed this 29th day of September, A. D. 1931.

(Seal)

M. J. Moore,
Acting Commissioner of Patents.